United States Patent
Leng

[11] Patent Number: 5,971,878
[45] Date of Patent: Oct. 26, 1999

[54] MULTIPLE SPROCKET ASSEMBLY FOR BICYCLE

[76] Inventor: Chi Chih Leng, No. 68, Lane 60, Guang Ming South Road, Nan Tou City, Nan Tou City, Nan Tou Hsien, Taiwan

[21] Appl. No.: 09/006,305

[22] Filed: Jan. 13, 1998

[51] Int. Cl.[6] .............................. F16H 9/00; F16H 55/12
[52] U.S. Cl. ............................................. 474/78; 474/160
[58] Field of Search .................................. 474/77, 78, 79, 474/160, 162, 152

[56] References Cited

U.S. PATENT DOCUMENTS

| | | | |
|---|---|---|---|
| 5,078,653 | 1/1992 | Nagano | 474/78 |
| 5,087,226 | 2/1992 | Nagano | 474/160 |
| 5,192,248 | 3/1993 | Nagano | 474/160 X |
| 5,413,534 | 5/1995 | Nagano | 474/78 |
| 5,738,603 | 4/1998 | Schmidt et al. | 474/160 X |

FOREIGN PATENT DOCUMENTS 0904014644  12/1993  Japan .................................. 474/160

*Primary Examiner*—John A. Jeffery
*Assistant Examiner*—Marcus Charles

[57] ABSTRACT

A multiple sprocket device for a bicycle includes a chain and two or more sprockets having different sizes and having a number of peripheral teeth for engaging with the chain. A number of guiding members are secured to the peripheral portion of the sprockets for securing the chain to the larger sprocket before the chain is engaged with the teeth of the larger sprocket when the chain is moved from the smaller sprocket to the larger sprocket. The guiding members each has a hook for engaging with the chain and for securing the chain to the larger sprocket.

5 Claims, 5 Drawing Sheets

MULTIPLE SPROCKET ASSEMBLY FOR BICYCLE

BACKGROUND OF THE INVENTION

1. Field of the Invention

The present invention relates to a sprocket, and more particularly to a multiple sprocket assembly having a guiding means for guiding the chain from the smaller sprocket to the larger sprocket.

2. Description of the Prior Art

Typical multiple sprockets for bicycles comprise a number of sprockets for shiftable engagement with a chain. The sprockets include a number of peripheral teeth that have been developed for various kinds of shapes and for guiding the chain to move from one of the chains to the other. However, no guiding means have been provided for supporting the chain in place before the chain is engaged with the teeth of the larger sprocket when the chain is moved from the smaller sprocket to the larger sprocket.

The present invention has arisen to mitigate and/or obviate the afore-described disadvantages of the conventional multiple sprockets for bicycles.

SUMMARY OF THE INVENTION

The primary objective of the present invention is to provide a multiple sprocket assembly having a guiding member for supporting the chain in place before the chain is engaged with the teeth of the larger sprocket when the chain is moved from the smaller sprocket to the larger sprocket.

In accordance with one aspect of the invention, there is provided a multiple sprocket assembly for a bicycle comprising a chain, a first sprocket and a second sprocket each including a plurality of peripheral teeth for engaging with the chain, the second sprocket including a size greater than that of the first sprocket, and means for holding the chain links in place to the second sprocket before the chain is engaged with the teeth of the second sprocket.

The second sprocket includes a peripheral portion, the holding means includes a plurality of guiding members secured to the peripheral portion of the second sprocket for engaging with the chain. The peripheral portion of the second sprocket includes a plurality of angularly spaced holes, the guiding members each includes a stem engaged in the holes for securing the guiding members to the second sprocket.

The guiding members each includes a hook for engaging with the chain and for holding the chain in place to the second sprocket. The guiding members each includes a first end having a head for engaging with the second sprocket, the head includes an outer portion, the hook is extended from the outer portion of the head for engaging with the chain. The hooks each includes a tapered surface for facilitating an engagement of the hook with the chain. The guiding members each includes a first end having a rivet to be riveted to engage with the second sprocket and to secure the guiding members to the second sprocket.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
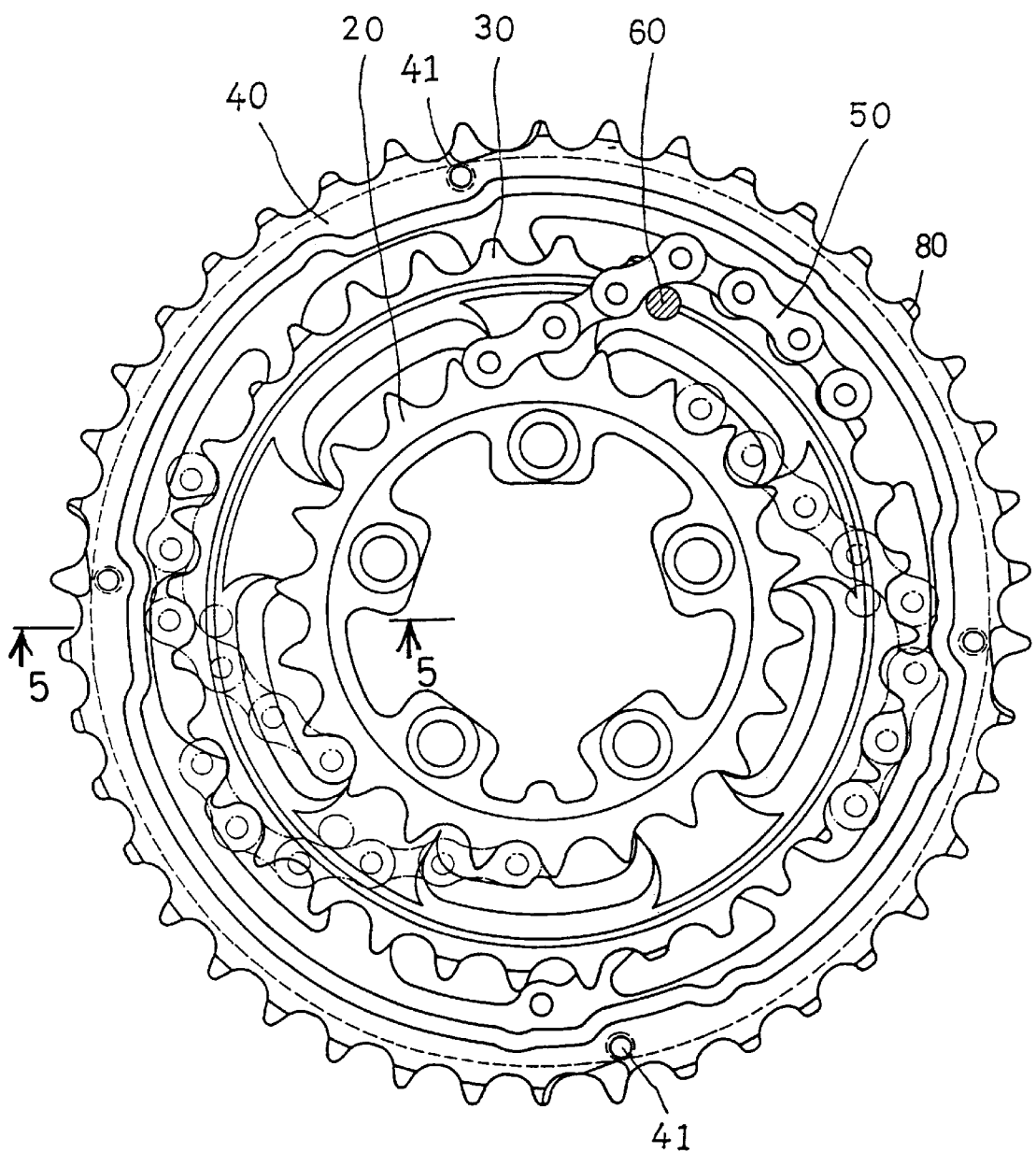
FIG. 1 is a front view of a multiple sprocket assembly in accordance with the present invention.
Figure 2:
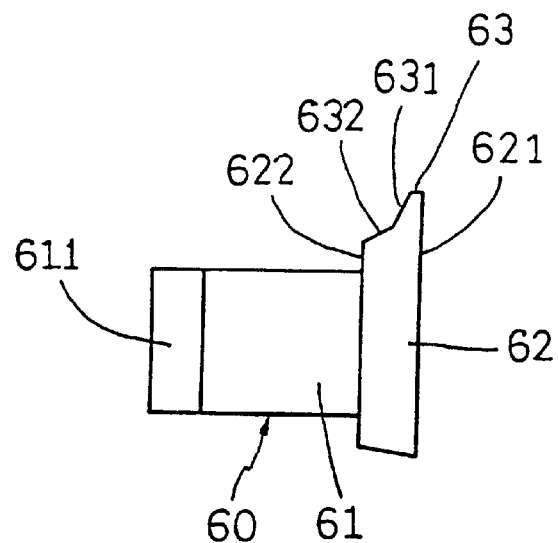
FIG. 2 is a plan view of a guiding member.
Figure 3:
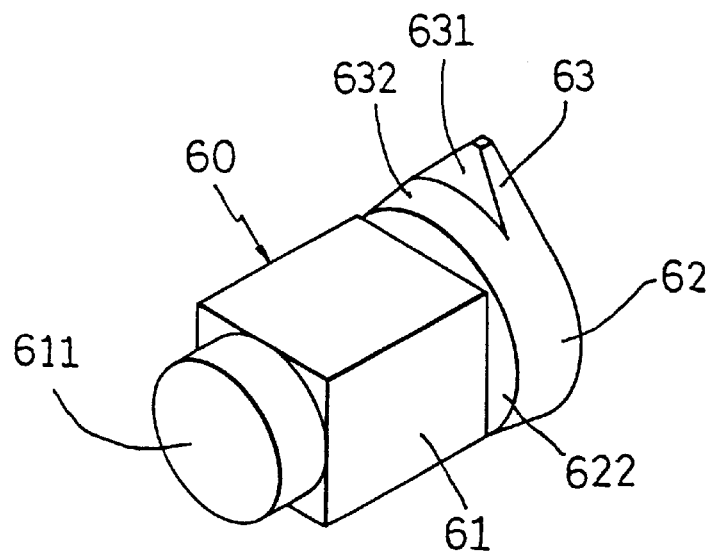
FIG. 3 is a perspective view of the guiding member.
Figure 4:
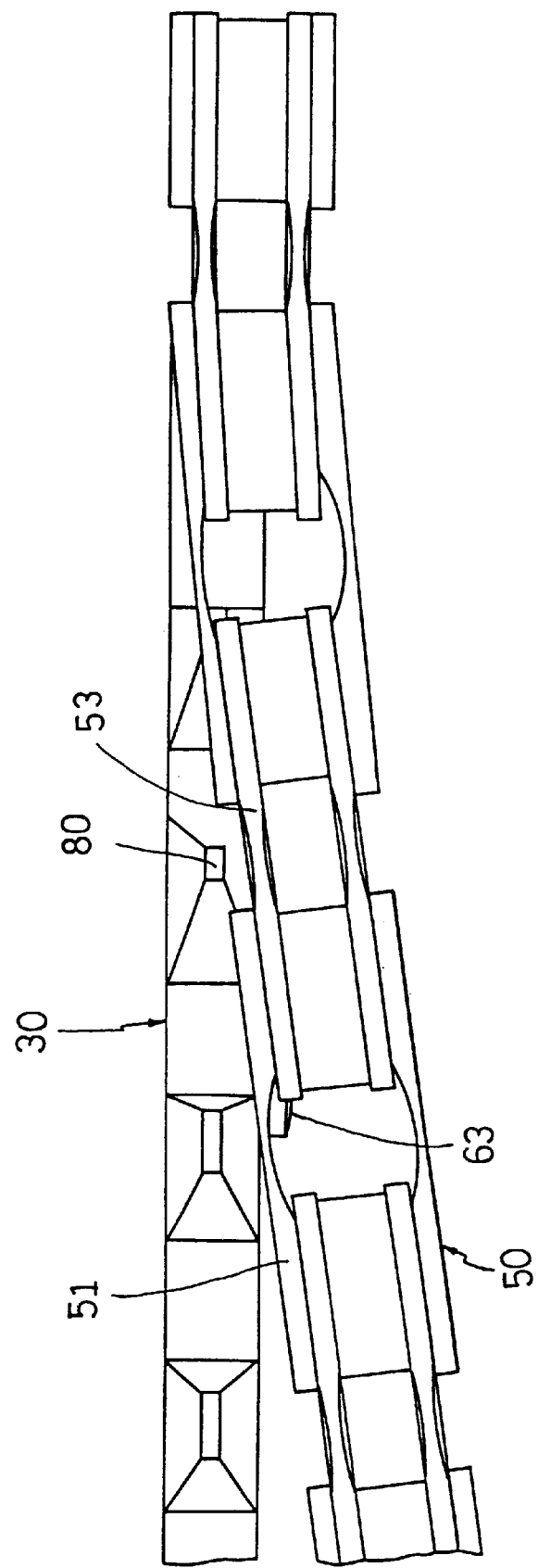
FIG. 4 is a partial top plan view illustrating the operation of the multiple sprocket assembly.

Referring to the drawings, and initially to FIGS. 1–5, a multiple sprocket assembly in accordance with the present invention comprises two or more sprockets 20, 30, 40 each including a number of peripheral teeth 80 for engaging with the chain 50. The chain 50 has a number pairs of outer links 51 and a number pairs of inner links 53 (FIG. 4). The sprockets 30, 40 each includes a number of angularly spaced holes 31, 41 for engaging with a number of guiding members 60. The holes 31, 41 may include either a circular cross section or a non-circular cross section for engaging with the guiding members 60 having corresponding cross section. For example, as shown in the drawings, the cross section of the guiding members 60 is square.

Figure 5:
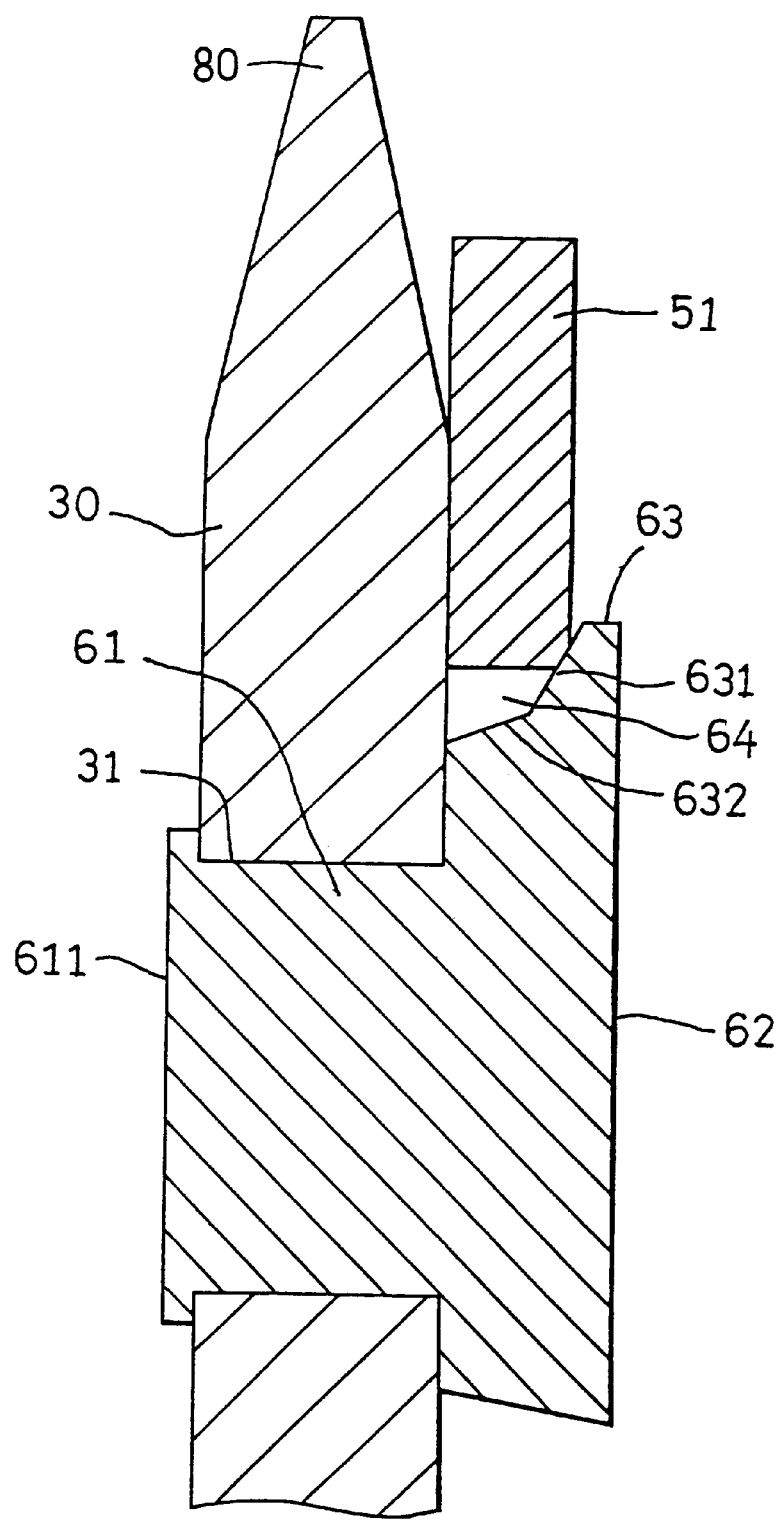
FIG. 5 is a partial cross sectional view taken along lines 5—5 of FIG. 1.

As best shown in FIGS. 2, 3 and 5, the guiding members 60 each includes a stem 61 for engaging in the holes 31, 41 and includes a head 62 secured to one end and includes an opposite end 611 to be deformed and riveted to engage with the sprockets 30, 40 (FIG. 5) for solidly securing the guiding members 60 to the sprockets 30, 40. The non-circular cross sections of the stem 61 and the holes 31, 41 may prevent the guiding members 60 from rotating relative to the sprockets 30, 40. The stem 61 may also be deformed and solidly secured to the sprocket for preventing the guiding members 60 for rotating relative to the sprockets 30, 40 when the stem 61 includes a circular cross section. The heads 62 each includes an outer portion 621 and an inner surface 622 facing toward the stem 61 for engaging with the sprockets 30, 40 (FIG. 5). The heads 62 each includes a hook 63 having a width about one half of that of the head 62 (FIGS. 2, 3) and having a tapered surface 631 facing toward the stem 61. The head 62 thus includes a shoulder 632 formed between the hook 63 and the inner surface 622. A space 64 (FIG. 5) is thus formed between the hook 63 and the sprocket 30, 40 for engaging with the chain link 51 (FIGS. 3, 4) and for holding the chain 50 in place before the chain is engaged with the teeth 80 of the sprockets 30, 40. The tapered surface 631 of the hook 63 may facilitate the engagement of the hook 61 with the chain 50.

Figure 6:
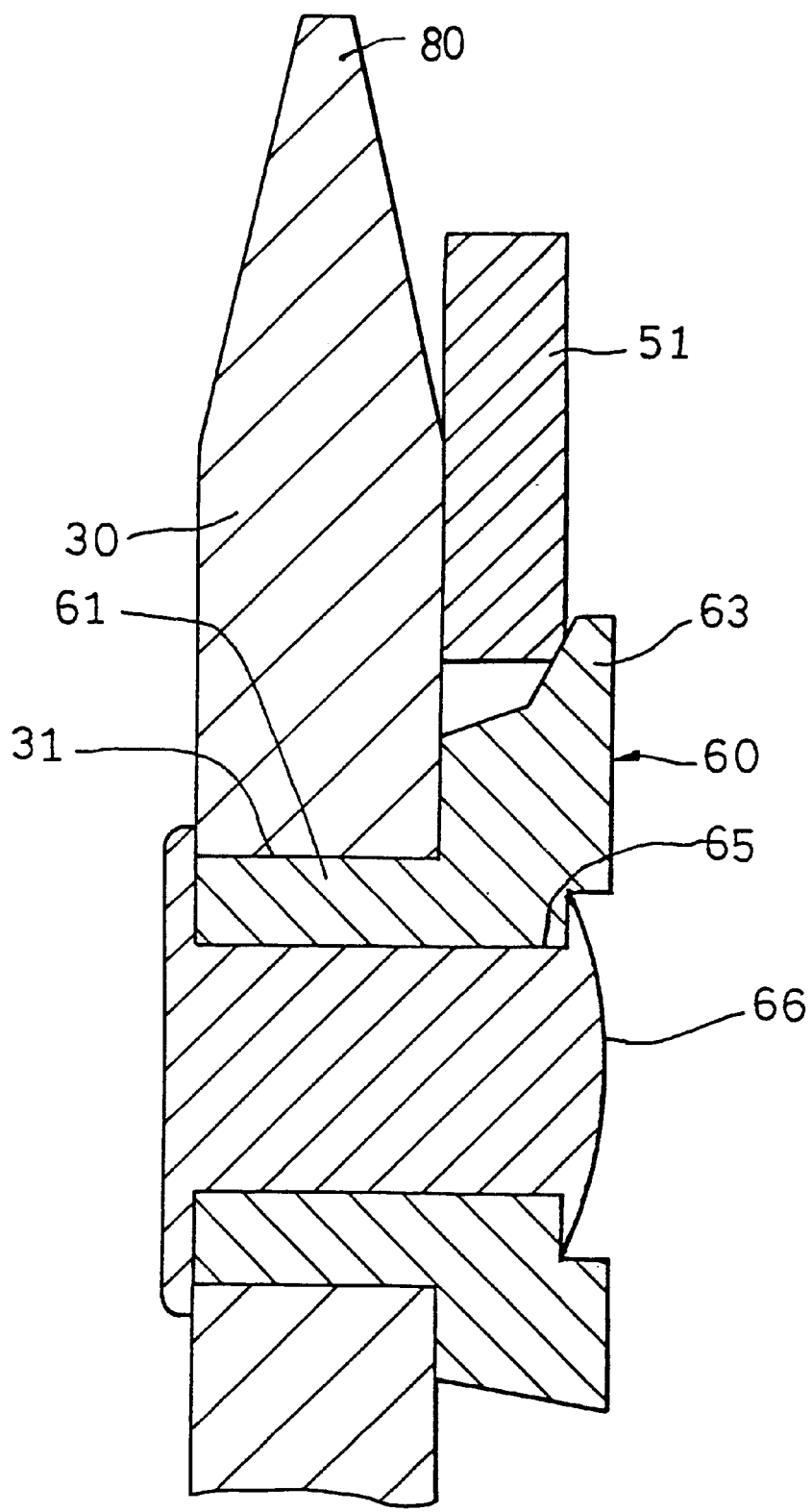
FIG. 6 is a partial cross sectional view similar to FIG. 5, illustrating the other application of the multiple sprocket assembly.

Referring next to FIG. 6, guiding members 60 may each includes a bore 65 for engaging with a rivet 66 which may solidly secure the guiding members 60 to the sprockets 30, 40.

Accordingly, the multiple sprocket assembly in accordance with the present invention includes a guiding member for supporting the chain in place before the chain is engaged with the teeth of the larger sprocket when the chain is moved from the smaller sprocket to the larger sprocket.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A multiple sprocket assembly for a bicycle, said multiple sprocket assembly comprising:

a chain, a first sprocket and a second sprocket each including a plurality of peripheral teeth for engaging with said chain, said second sprocket including a size greater than that of said first sprocket and including a peripheral portion having a plurality of angularly spaced holes formed therein, said holes of said second sprocket each including a non-circular shape, a plurality of guiding members secured to said peripheral portion of said second sprocket for engaging with and for securing said chain to said second sprocket before said chain is engaged with said teeth of said second sprocket, said guiding members each including a stem engaged in said holes of said second sprocket and securing said guiding members to said second sprocket, and also each guiding member including a hook for engaging with said chain and comprising a projection holding said chain in place to said second sprocket, said stems of said guiding members each including a non-circular cross section corresponding to the shape of said holes of said second sprocket for engaging with said holes of said second sprocket thus preventing said stems from rotating relative to said second sprocket.

2. The multiple sprocket assembly according to claim 1, wherein said guiding members each includes a first end having a head for engaging with said second sprocket, said head includes an outer portion, said hook is extended from said outer portion of said head for engaging with said chain.

3. The multiple sprocket assembly according to claim 1, wherein said guiding members each includes a first end having a rivet to be riveted to engage with said second sprocket and to secure said guiding members to said second sprocket.

4. The multiple sprocket assembly according to claim 1, wherein each said projection has a tapered surface for facilitating an engagement of said hook with said chain.

5. The multiple sprocket assembly according to claim 2, wherein said head includes an inner surface facing toward said stem of said guiding member and includes a shoulder formed between said hook and said inner surface of said head.

\* \* \* \* \*